United States Patent
Grimm et al.

(10) Patent No.: US 6,575,524 B2
(45) Date of Patent: Jun. 10, 2003

(54) ONE PIECE MOLDED PICK-UP BED

(75) Inventors: Rainer Grimm, Frankfurt (DE); Steven Foster, Rochester Hills, MI (US); Holly Giangrande, Troy, MI (US); Charlie Hopson, Lebanon, TN (US); Roch Tolinski, Howell, MI (US); Laurent Arquevaux, Sully sur Loire (FR); Carmelo Mondello, Frankfurt (DE); Nick Kalageros, West Midlands (GB)

(73) Assignee: Meritor Light Vehicle Systems, Inc., Troy, MI (US)

( * ) Notice: Subject to any disclaimer, the term of this patent is extended or adjusted under 35 U.S.C. 154(b) by 0 days.

(21) Appl. No.: 10/039,643

(22) Filed: Oct. 24, 2001

(65) Prior Publication Data

US 2003/0034663 A1 Feb. 20, 2003

Related U.S. Application Data

(62) Division of application No. 09/592,325, filed on Jun. 13, 2000, now Pat. No. 6,422,642.

(51) Int. Cl.[7] .............................. B60P 1/00; B60P 3/00; B60P 9/00
(52) U.S. Cl. ...................................... 296/183
(58) Field of Search ........................... 296/183, 100.06, 296/208, 39.1, 39.2

(56) References Cited

U.S. PATENT DOCUMENTS

| | | |
|---|---|---|
| D248,386 S | 7/1978 | Hefner |
| 4,613,183 A | 9/1986 | Kesling |
| 4,890,874 A | 1/1990 | Davis |
| 4,986,590 A | 1/1991 | Patti et al. |
| 5,725,712 A | 3/1998 | Spain et al. |
| 5,755,481 A | 5/1998 | Emery |
| RE36,457 E | 12/1999 | Ellison et al. |
| 6,036,258 A | 3/2000 | Clare et al. |
| 6,042,678 A | 3/2000 | Johnson et al. |
| 6,059,343 A | 5/2000 | Emery |
| 6,089,639 A | 7/2000 | Wojnowski |
| 6,168,742 B1 | 1/2001 | Yamamoto |
| 6,180,207 B1 | 1/2001 | Preisler et al. |
| 6,187,233 B1 | 2/2001 | Smith |
| 6,349,988 B1 * | 2/2002 | Foster et al. |

* cited by examiner

Primary Examiner—D. Glenn Dayoan
Assistant Examiner—Scott A. Carpenter
(74) Attorney, Agent, or Firm—Carlson, Gaskey & Olds

(57) ABSTRACT

A vehicle pick-up bed is disclosed that can be folded into shape by hand. The pick-up bed includes a generally flat sheet of colored material molded together with a generally flat sheet of reinforced polymeric material. Preferably, the sheet of colored material is placed in the mold and the reinforced polymeric material is injected into the mold, onto the back of the colored sheet. During the molding process, the reinforced polymeric material and the colored material are formed or molded into a single, generally flat, solid component. The sheet of colored material adheres to the reinforced polymeric material. Once molded, the sides of the pick-up bed are folded into shape along hinge edges and connected to stay in place. Hinge edges could be formed by locating few or no reinforcing fibers in the reinforced polymeric material in the desired location of the hinge edges. The colored material is preferably.a paintless polymer film. Alternatively, the colored material is pre-painted aluminum. As a result of using either of these two options, there is greater flexibility in adding color to the vehicle. Due to the injection molding process, additional features can be directly molded into the component. For instance, a drainage system, brake light attachments, brake light covers, wiring conduit, fender attachments, or a cargo cover can be directly molded into the reinforced polymeric backing material during the molding process.

25 Claims, 3 Drawing Sheets

ONE PIECE MOLDED PICK-UP BED

This application is a divisional of Ser. No. 09/592,325 filed on Jun. 13, 2000 now U.S. Pat. No. 6,422,642.

BACKGROUND OF THE INVENTION

This invention generally relates to a vehicle pick-up bed and more particularly to a pick-up bed made of polymeric material that can be folded into shape.

The open section in the back of a pick-up truck is commonly referred to as a pick-up bed. Pick-up beds include a base section, three side walls, and a tailgate. The base section is also known as the floor of the bed. Two of the side walls are the same size, positioned parallel to each other, and extend along the sides of the vehicle adjacent the tires. The third side wall is positioned perpendicular to and between the first two side walls, adjacent the cab of the pick-up truck. Finally, the lift-gate is positioned perpendicular to and between the first two side walls at their opposite ends from the third side wall, at the rear of the vehicle. The lift-gate is essentially a door that opens to allow access into the pick-up bed. Typically, pick-up beds are used for storing and Currently, pick-up beds are formed from metal. However, there are several disadvantages of metal pick-up beds, including, but not limited to, susceptibility to denting and corrosion.

Since it is common to transport objects in a pick-up bed, there is a high probability that the bed will dent or scratch during loading and unloading. Further, if the bed is made from metal, a scratch will cause corrosion. Currently pick-up truck owners use bedliners to minimize denting and scratching of the pick-up bed. Typically, a bedliner is a plastic insert that fits into the pick-up bed to protect the base section and side walls. The disadvantage of a bedliner is that it is an additional expense for the pick-up truck owner. Therefore, there is a need for a pick-up bed that resists denting and scratching without the use of a bedliner.

Another disadvantage of metal pick-up beds is that they are costly to produce because they are manufacturing intensive. There are several different methods of manufacturing pick-up beds. One method is to form the bed from several metal pieces. Each metal piece is individually stamped and, typically, all the pieces are welded together. Also metal pick-up beds require painting to match the color of the vehicle.

Yet another disadvantage of a metal pick-up bed is its weight. For instance, as the weight of a vehicle increases, the gas mileage of the vehicle decreases. Therefore, it is desirable to decrease the weight of the vehicle to improve a variety of vehicle performance factors, including, gas mileage.

SUMMARY OF THE INVENTION

The pick-up bed of the present invention overcomes the above problems with known pick-up beds. In general terms, the pick-up bed of the present invention includes a generally flat sheet of colored material and a generally flat sheet of reinforced polymeric material molded to the sheet of colored material. Preferably, the reinforced polymeric material is injection molded onto the back of the colored material. The colored material is preferably a paintless polymeric film or alternatively pre-painted aluminum. Preferably, the generally flat sheet of colored material is placed in the bottom of a mold and a mixture of reinforced polymeric material is injected into the mold onto the back of the sheet of colored material. During the molding process the two materials are adhered together, forming a molded, generally flat pick-up bed component. Once the molding is complete, the pick-up bed component is folded into shape.

This application is related to application Ser. No. 09/570,714, entitled "One Piece Molded Pick-Up Bed With Fenders", and filed on Jun. 13, 2000.

The molded pick-up bed component includes a generally rectangular center section and three generally rectangular side wall sections. Each side wall section is attached to the center section along a hinge edge. The hinge edges are bendable because fewer or no reinforcing fibers are located along the hinge edges.

The pick-up bed of the present invention is less expensive and simpler to manufacture than metal pick-up beds. One reason is because fewer components need to be manufactured. Further, those components that are manufactured are cheaper to produce. Also, the completely assembled pick-up bed does not need to be painted because the sheet of colored material, either paintless film or pre-painted aluminum is adhered to the sheet of reinforced polymeric material prior to folding the pick-up bed into shape. Using paintless film or pre-painted aluminum to add color to the pickup bed is less expensive than painting the bed after assembly to match the color of the vehicle.

Further, the pick-up bed of the-present invention significantly reduces the weight of the vehicle since the materials that comprise the component are lightweight polymers or aluminum. There is no need to use a bedliner with the pick-up bed of the present invention because the polymeric material and aluminum, if used, resists denting and corrosion.

These and other features of the invention may be best understood from the following specification and drawings. The following is a brief description of the drawings.

DETAILED DESCRIPTION OF THE PREFERRED EMBODIMENT

Figure 1:
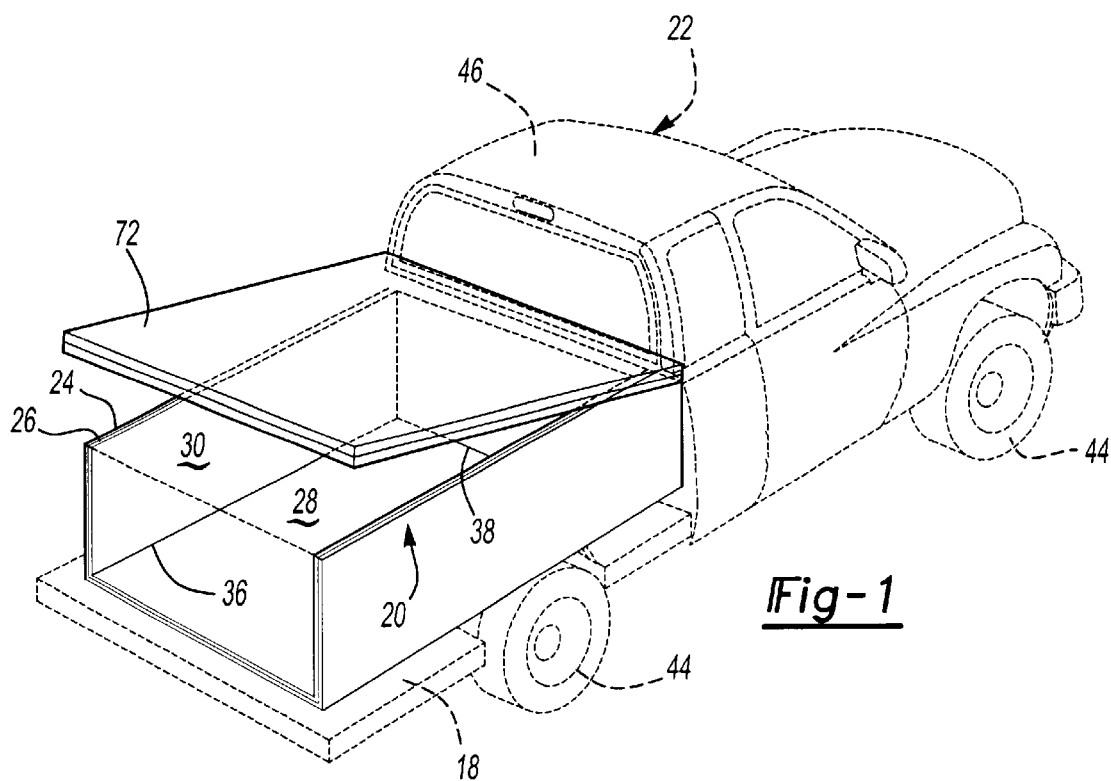
FIG. 1 is a perspective view shown partially in phantom of the device of the present invention installed in a pick-up truck.
Figure 2:
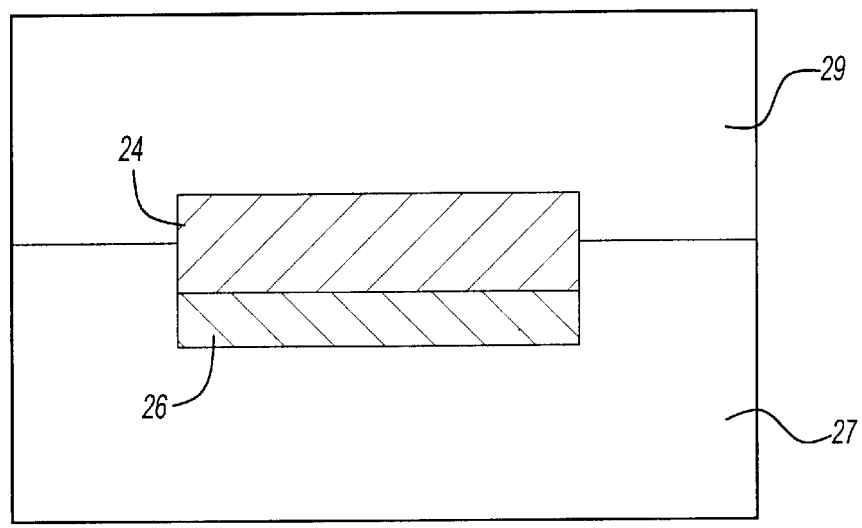
FIG. 2 is a cutaway view of molding the present invention.
Figure 3:
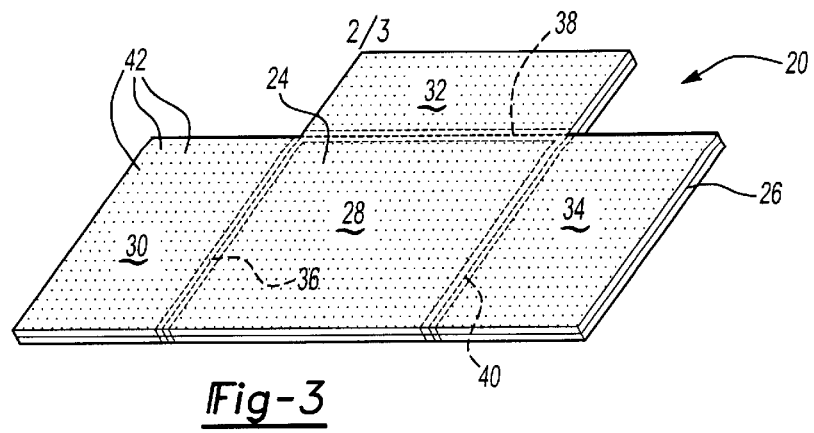
FIG. 3 is a perspective view of the adhered materials prior to folding the device of the present invention into shape.

FIG. 1 illustrates vehicle pick-up bed of the present invention, shown generally at 20, installed in a pick-up truck 22. As shown in FIG. 2, the vehicle pick-up bed component is formed from a sheet of colored material 26 adhered to a generally flat sheet of reinforced polymeric material 24. In other words, the pick-up bed component 20 includes a sheet of colored material 26 with an injection molded reinforced polymeric material 24 backing. Preferably, the generally flat, colored sheet of material 26 is placed in the bottom of a mold 27, having a mold halve 29. The mold is shown schematically. The reinforced polymeric material 24 is injected into the mold 27, 29 over the back side of the colored sheet of material 26. The reinforced polymeric material 24 and the colored material 26 are molded into a solid, forming a generally flat component. During the molding process the sheet of colored material 26 adheres to the reinforced polymeric material 24, forming a single component 20. As shown in FIG. 3, the molded component 20 is generally flat and includes the colored layer 26 and the layer of reinforced polymeric material 24 adhered together.

Rather than using a prefabricated material 26, a two shot mold technique could form material 26 in the mold. Further, materials 24 and 26 could be made separately and attached outside the mold.

When the molding process is complete, the generally flat component 20 is folded into the shape of the pick-up bed 20. Fewer or no reinforcing fibers are located in areas where the component 20 is designed to fold and bend. The assembled pick-up bed 20 is then connected to the pick-up truck 22. Preferably, metal attachments are used to secure the pick-up bed 20 to the body of the pick-up truck 22. The metal attachments can be directly molded into the component 20. The colored sheet of material 26 is preferably a paintless polymer film. Alternatively, the colored sheet of material 26 could be pre-painted aluminum.

The pick-up bed component 20 including the adhered reinforced polymeric backing material 24 and colored top layer of material 26 form center section 28, a first side wall section 30, a second side wall section 32, and a third side wall section 34. The center section 28, first side wall section 30, second side wall section 32, and the third side wall section 34 are all generally rectangular. Since either a paintless polymeric film or pre-painted aluminum is used to color the pick-up bed, each section could be a different color. For example, different color sheets of colored material 26 can be used for different sections 28, 30, 32, 34. In other words, there is greater flexibility in color options.

Each of the side wall sections 30, 32, 34 is connected to the center section 28 via a hinge edge. A first hinge edge 36 is positioned between the center section 28 and the first side wall section 30. A second hinge edge 38 is positioned between the center section 28 and the second side wall section 32. A third hinge edge 40 is positioned between the center section 28 and the third side wall section 34.

The reinforced polymeric material is reinforced with reinforcing fibers 42. Preferably, hinge edges 36, 38, 40 are formed because there are fewer reinforcing fibers 42 located in the vicinity of the hinge edges 36, 38, 40. Alternatively, there are no reinforcing fibers 42 located in the vicinity of the hinge edges 36, 38, 40. Other ways of forming a hinge edge can be used.

Figure 4:
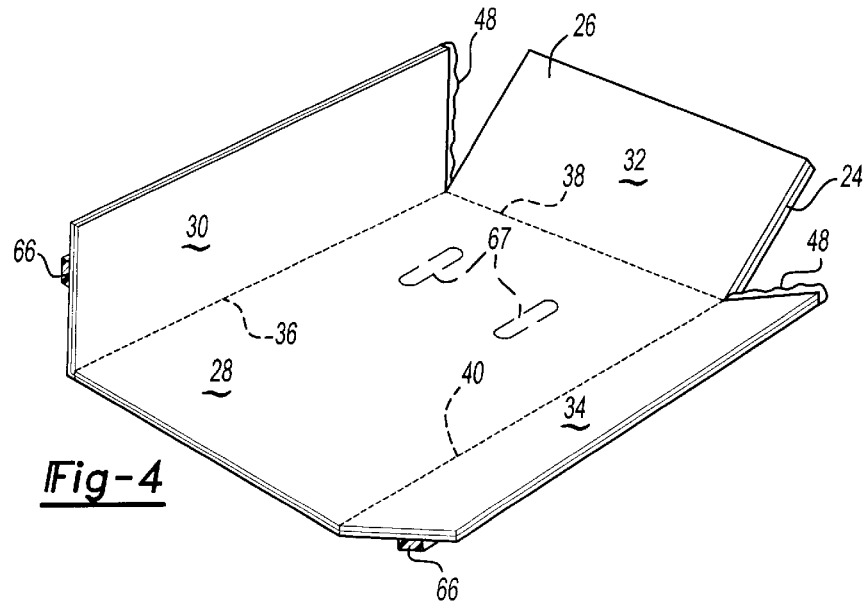
FIG. 4 is a perspective view of the device of the present invention being folded into shape.

As shown in FIG. 4, preferably the first, second, and third side wall sections 30, 32, 34 are folded toward the colored sheet of material 26. The side wall sections 30, 32, 34 are folded until they are perpendicular to the center section 28, or positioned approximately 90° from the center section 28. The hinge edges 36, 38, 40 are flexible enough that the side wall sections 30, 32, 34 can be folded into place by hand. No other tooling is required. Alternatively, the side wall sections 30, 32, 34 can be folded into shape by a robot. Robots would be used to facilitate production, not because a large force is required to fold the side wall sections.

The first and third side wall sections 30, 34 run parallel to each other along the sides of the vehicle adjacent the tires 44. The second side wall section 32 is positioned between and perpendicular to the first and third side wall sections 30, 34. The second side wall section 32 is adjacent the cab 46 of the vehicle 22. (See FIG. 1)

Once the side wall sections are folded into shape, they are connected together. As shown in FIG. 4, the first side wall section 30 connects to the second side wall section 32 and the second side wall section 32 connects to the third side wall section 34. In other words, there will be two seams. One seam is between the first side wall section 30 and the second side wall section 32. The other seam is between the second side wall section 32 and the third side wall section 34. Preferably, the side wall sections are connected by plastic welding. Alternatively, the side wall sections snap together.

Figure 5:
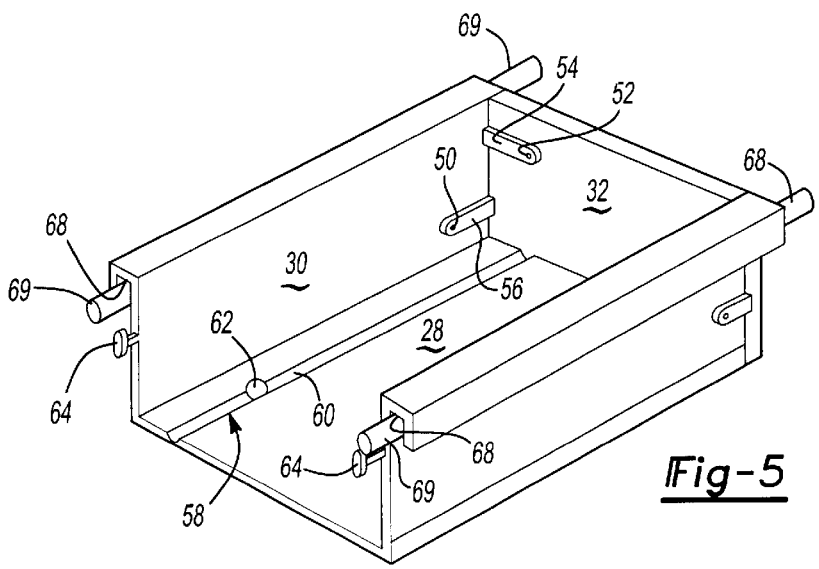
FIG. 5 is a perspective view of an alternative embodiment of the present invention.

The side wall sections are plastically welded together by applying an adhesive 48 to the edges of the two side walls that need to be connected. In an alternative embodiment, as shown in FIG. 5, each side wall has at least one projection 50, 52 and at least one flap 54, 56 having a hole for receiving a projection 50, 52 for each seam. For example, only one seam is shown in FIG. 5. The projection 50 on the first side wall section 30 is aligned with the flap 56 on the second side wall section 32. The projection 52 on the second side wall section 32 is aligned with the flap 54 on the first side wall section 30. Each projection 50, 52 snaps into its corresponding flap 54, 56 hole.

Several additional features can be directly molded into the pick-up bed component 20. For instance, a drainage system can be molded into the pick-up bed component 20. The drainage system prevents water from accumulating in the pick-up bed. One possible drainage system 58 is shown in FIG. 5. Grooves 60 and drainage holes 62 can be formed right in the center section 28 of the pick-up bed. Although only one groove and one drainage hole are any number of them can be molded into the pick-up bed.

Brake light attachments 64 can also be directly molded into the pick-up bed component 20. Brake light covers connect to the vehicle via the brake light attachments. Further, brake light covers 66 can be directly molded into the pick-up bed component 20. (See FIG. 4) Incorporating either brake light attachments 64 or the brake light covers 66 themselves, eliminates the need to manufacture and add additional components to the vehicle during the assembly process. Attachments 67 can be directly molded into the component 20 to allow fastening the bed assembly 20 to the vehicle chassis 18 (See FIG. 1). The attachments can be metal or any other material. Further, other types of attachments can be directly molded into the component for other purposes. For instance, attachments can be directly molded into the component 20 to receive a cargo cover for the pick-up bed.

Another possibility is to directly mold wiring conduit 68 into the pick-up bed component 20. (See FIG. 5) Wiring conduit 68 is a compartment used to contain and isolate the wires 69 that run throughout the vehicle. Essentially, in the present invention the wires become encapsulated by the reinforced polymeric material 24 during the molding process. Therefore, a short is less likely to occur than in wires running through standard wiring conduit.

Figure 6:
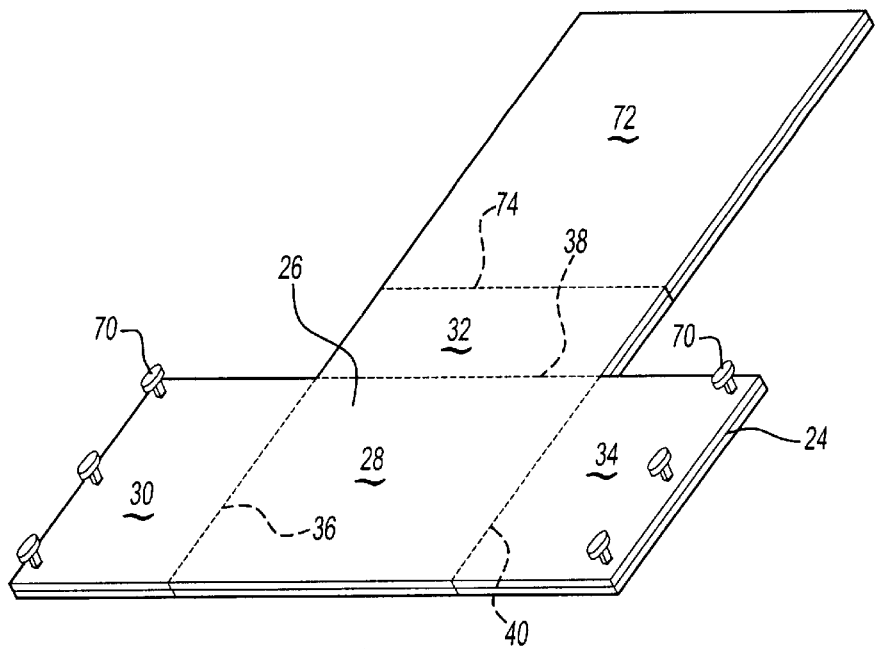
FIG. 6 is a perspective view of the pre-folded device of the present invention including a cargo cover.

As shown in FIG. 6, fender attachments 70 and a cargo cover 72 can also be directly molded into the pick-up bed component 20. The vehicle's fenders would connect to the vehicle via the fender attachments. Cargo covers protect the contents in the pick-up bed when it is in the closed position. Preferably, the cargo cover 72 is a generally rectangular section that is attached to the second side wall section 32 along a fourth hinge edge 74. When the cargo cover 72 is in the closed position, it rests on the top edges of the first and third side wall sections 30, 34.

Figure 7:
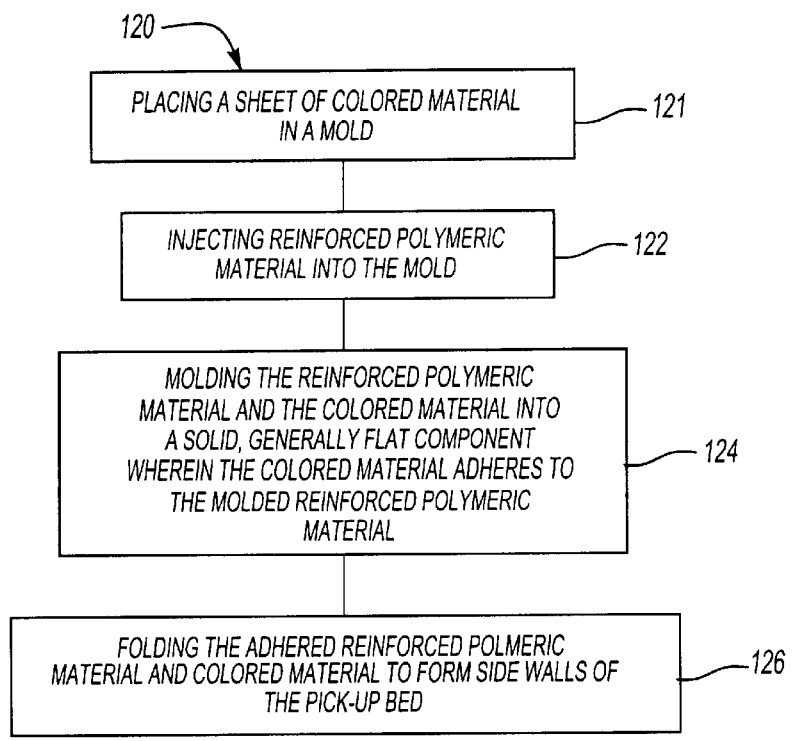
FIG. 7 is a flowchart diagram illustrating the preferred method of this invention.

FIG. 7 schematically illustrates the preferred method of forming the pick-up bed 20. The flow chart 120 includes a first step at 121 where a sheet of colored material 26 is placed in a mold 27, 29. Preferably, the sheet of colored material 26 is heated so that it becomes, more pliable. At 122, reinforced polymeric material 24 is injected into the mold 27, 29, preferably onto the back of the colored material. At 124, the reinforced polymeric material 24 and the colored material 26 are formed or molded into a solid, generally flat component 20 wherein the colored material 26 adheres to the molded reinforced polymeric material 24. The adhered reinforced polymeric material 24 and colored material 26 are folded to form side walls of the pick-up bed, as shown at 126.

A suitably tough plastic is preferably used. A worker in this art would be able to select an appropriate plastic.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A method of forming a vehicle pick-up bed, comprising the steps of:
   (A) placing a sheet of colored material in a mold;
   (B) injecting reinforced polymeric material into the mold;
   (C) molding said reinforced polymeric material and said colored material into a solid, generally flat component wherein said colored material adheres to said molded reinforced polymeric material; and
   (D) forming pick-up bed side walls by folding the flat component into a vehicle pick-up bed.

2. The method of forming a pick-up bed of claim 1, wherein a drainage system, brake light attachments, conduit, fender attachments, and a cargo cover are molded into said component.

3. The method of forming a pick-up bed of claim 1, wherein brake light covers are molded into said component.

4. The method of forming a pick-up bed of claim 1, including the step of mounting the vehicle pick-up bed to a vehicle chassis of a pick-up truck after step (D).

5. A method of forming a vehicle pick-up bed, comprising the steps of:
   (A) providing a generally flat component having a plurality of bed sections;
   (B) folding selected bed sections to form a pick-up bed; and
   (C) mounting the pick-up bed directly to a vehicle chassis.

6. The method of forming a pick-up bed of claim 5 wherein step (A) includes forming the flat component from a plurality of materials and including the step of attaching a layer of colored material to a layer of reinforced polymeric material.

7. The method of forming a pick-up bed of claim 6 wherein step (A) further includes placing a sheet of the colored material in a mold, injecting the reinforced polymeric into a single piece.

8. The method of forming a pick-up bed of claim 6 wherein the colored material comprises a paintless polymer film.

9. The method of forming a pick-up bed of claim 6 wherein the colored material comprises pre-painted aluminum.

10. The method of forming a pick-up bed of claim 6 wherein step (A) further includes forming hinge areas between each of the bed sections and forming the layer of reinforced polymeric material with a first predetermined amount of fibers in the bed sections and a second predetermined amount of fibers in the hinge areas with the second predetermined mount being less then the first predetermined amount.

11. The method of forming a pick-up bed of claim 10 wherein step (B) includes folding the flat component along each of the hinge areas to properly position each bed section to form the pick-up bed.

12. The method of forming a pick-up bed of claim 11 wherein the bed sections include a center section, a first side wall, a second side wall, and a third side wall and wherein step (B) further includes folding the first side wall relative to the center section along a first hinge area, folding the second side wall relative to the center section along a second hinge area, and folding the third side wall relative to the center section along a third hinge area.

13. The method of forming a pick-up bed of claim 12 including the step of folding the first, second, and third side walls ninety degrees relative to the center section.

14. The method of forming a pick-up bed of claim 12 including the step of plastically welding the first and third side walls to the second side wall.

15. The method of forming a pick-up bed of claim 12 including the step of snapping the first and third side walls to the second side wall.

16. The method of forming a pick-up bed of claim 12 wherein the bed sections further include a cargo cover section extending from the second side wall and wherein step (B) further includes folding the cargo cover section relative to the second side wall along a fourth hinge area.

17. The method of forming a pick-up bed of claim 12 wherein step (B) includes integrally molding the layer of colored material to the layer of reinforced polymeric material to form the flat component and further including the step of molding a plurality of fender attachments into the flat component in the first and third side walls.

18. The method of forming a pick-up bed of claim 6 wherein step (B) includes integrally molding the layer of colored material to the layer of reinforced polymeric material to form the flat component and molding a plurality of metal attachments into the flat component and wherein step (C) includes the step of securing the pick-up bed to the vehicle chassis with the metal attachments.

19. The method of forming a pick-up bed of claim 6 including the step of forming at least two of the bed sections with differing colors from each other by varying the layer of colored material.

20. The method of forming a pick-up bed of claim 6 wherein step (B) includes integrally molding the layer of colored material to the layer of reinforced polymeric material to form the flat component and further including the step of molding a drainage portion into the flat component.

21. The method of forming a pick-up bed of claim 6 wherein step (B) includes integrally molding the layer of colored material to the layer of reinforced polymeric material to form the flat component and further including the step of molding a brake light attachment into the flat component.

22. The method of forming a pick-up bed of claim 6 wherein step (B) includes integrally molding the layer of colored material to the layer of reinforced polymeric material to form the flat component and further including the step of molding a brake light cover into the flat component.

23. The method of forming a pick-up bed of claim 6 wherein step (B) includes integrally molding the layer of colored material to the layer of reinforced polymeric material to form the flat component and further including the step of molding a at least one wiring conduit into the flat component.

24. The method of forming a pick-up bed of claim 6 wherein step (A) further includes injecting a preselected color material in a mold, injecting the reinforced polymeric material into the mold, and molding the reinforced polymeric material and the colored material into a single piece.

25. A vehicle pick-up bed, comprising:
 a generally flat layer of reinforced polymeric material; and
 a generally flat layer of colored material that is aligned with and attached to said layer of reinforced polymeric material wherein said layers of reinforced polymeric material and colored material form a generally flat component including multiple bed sections separated from one another by hinge areas with each of said bed sections foldable relative to one another along the hinge areas for formation of a pick-up bed; and
 a plurality of mounts attached to the flat component to mount the pick-up bed to a vehicle chassis.

* * * * *

UNITED STATES PATENT AND TRADEMARK OFFICE
CERTIFICATE OF CORRECTION

PATENT NO. : 6,575,524 B2
DATED : June 10, 2003
INVENTOR(S) : Grimm et al.

It is certified that error appears in the above-identified patent and that said Letters Patent is hereby corrected as shown below:

<u>Column 5,</u>
Line 64, "into a" should read -- into the mold, and molding the reinforced polymeric material and the colored material into a --.

Signed and Sealed this

Twenty-third Day of September, 2003

JAMES E. ROGAN
*Director of the United States Patent and Trademark Office*